Nov. 8, 1927.  1,648,675

J. L. COFFIELD

CLUTCH MECHANISM FOR WASHING MACHINES

Filed April 4, 1923    3 Sheets-Sheet 1

Inventor
JAMES L. COFFIELD.

By Edward R. Reed
Attorney

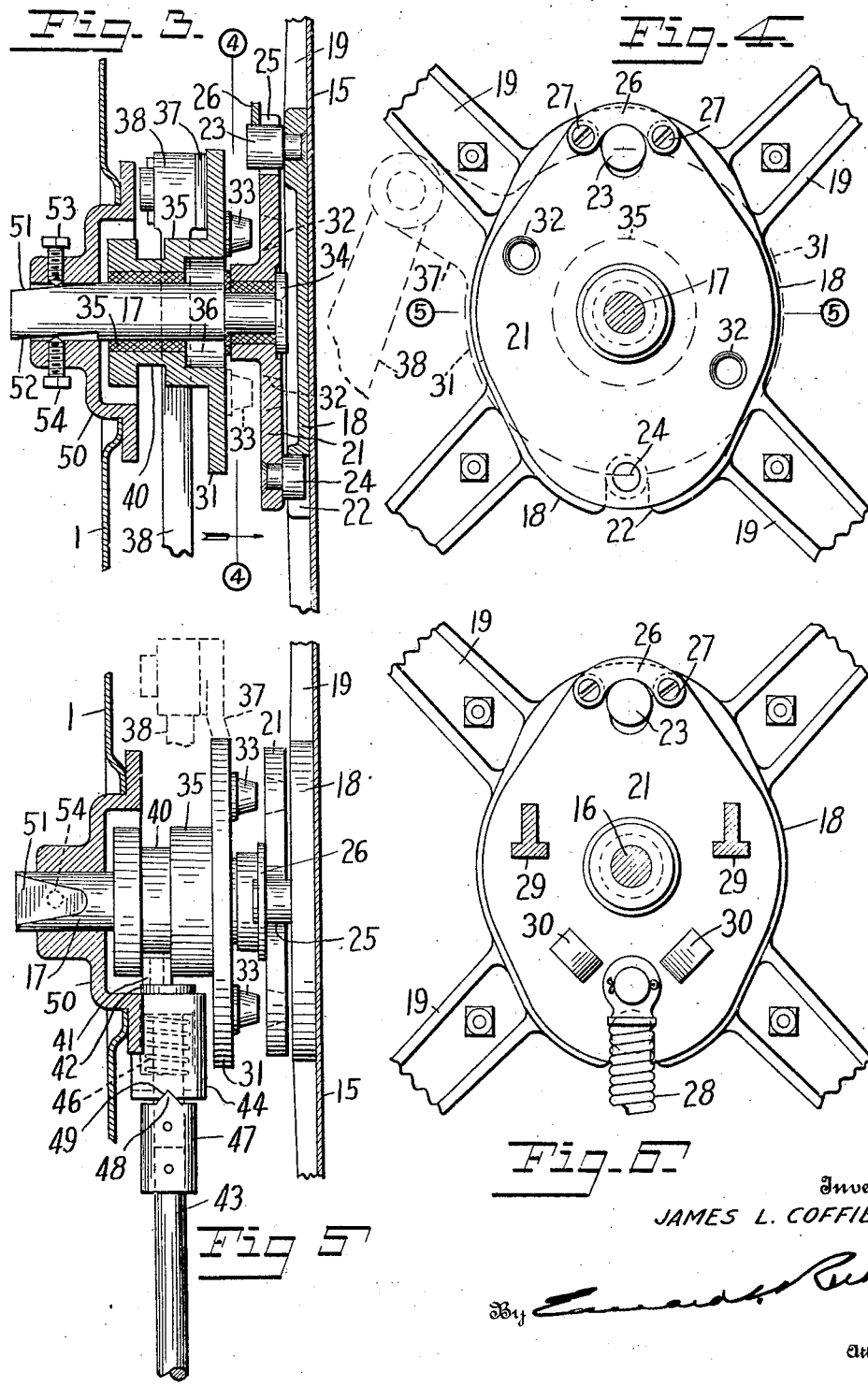

Patented Nov. 8, 1927.

1,648,675

UNITED STATES PATENT OFFICE.

JAMES L. COFFIELD, OF DAYTON, OHIO.

CLUTCH MECHANISM FOR WASHING MACHINES.

Application filed April 4, 1923. Serial No. 629,759.

This invention relates to washing machines and more particularly to a clutch mechanism adapted to be interposed between an oscillating tub and the driving mechanism therefor.

Washing machines of the type embodying an oscillating tub have heretofore been provided with clutch mechanism, one member of which was directly connected to the end of the tub and the other member of which was connected with the driving mechanism and was movable into and out of engagement with the first mentioned member. This construction is entirely satisfactory when the frame is formed of cast iron or other comparatively rigid material, but when the frame is more or less resilient, as when it is formed of pressed steel or the like, the pressure of the clutch will impose a transverse strain upon the frame which will tend to distort the same, more or less, and thus throw the bearings and other operating parts carried by the frame out of alinement. In order to overcome this objectionable feature it is one object of the present invention to provide a clutch of such a character and so mounted that the pressure thereon will impose little or no transverse strain on the frame.

Washing machines of this type are of such weight and bulk that they cannot be conveniently handled by one man, but by removing the wringer and the tub from the frame the three parts into which the machine is thus divided can be easily handled, thus enabling one man to deliver or otherwise handle the machine. The wringers are usually removably mounted on the frame but heretofore it has not been customary to removably mount the tub. A further object of the present invention is to provide an oscillating tub which will be mounted on the frame in such a manner that it may be readily removed therefrom; and further, to provide such a machine in which one end of the tub will be supported directly upon one of the clutch members and will be readily separable therefrom.

Other objects of the invention will appear as the mechanism is described in detail.

Figure 1:
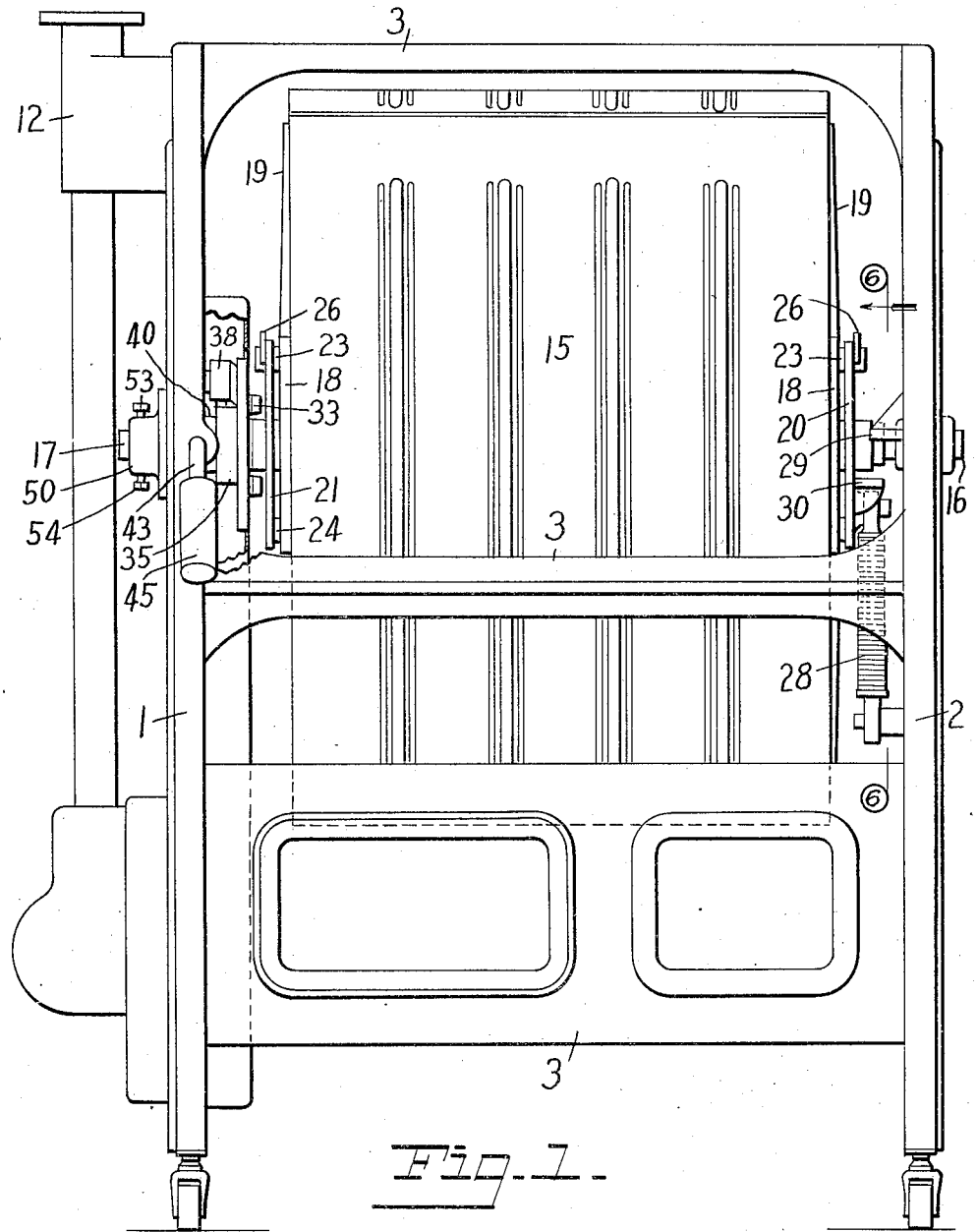
Figure 2:
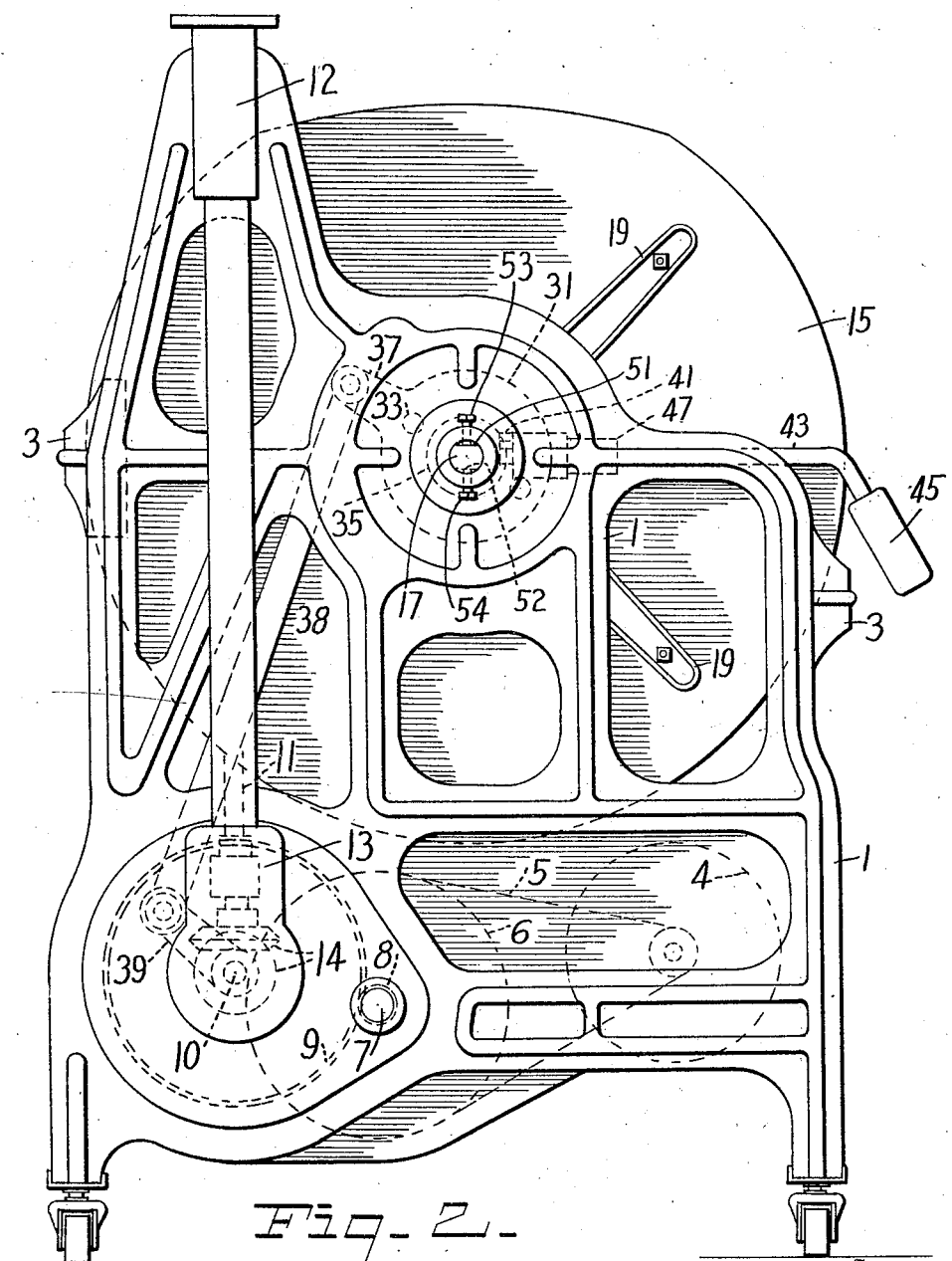

In the accompanying drawings Fig. 1 is a front elevation of a washing machine embodying the invention; Fig. 2 is an end elevation of the same; Fig. 3 is a section taken vertically through the clutch mechanism; Fig. 4 is a section taken on line 4—4 of Fig. 3 looking in the direction of the arrows; Fig. 5 is a section taken on line 5—5 of Fig. 4 showing the clutch in elevation; and Fig. 6 is a section taken on line 6—6 of Fig. 1.

In these drawings I have illustrated one embodiment of my invention and have shown the same as applied to a washing machine of a well known type, but it will be understood that this particular embodiment has been chosen for the purposes of illustration only and that the invention may take various forms and may be applied to machines of different construction from that here shown.

The washing machine here illustrated comprises a main frame consisting of end members 1 and 2 connected one to the other by transverse bars 3. Preferably the driving mechanism is all mounted on one of the end members of the frame and, as here shown, a motor 4 is connected by a belt 5 to a pulley 6 mounted on a shaft 7 journaled in the end frame 1. This shaft is also provided with a pinion 8 which meshes with a gear 9 on a main driving shaft 10 which is connected to both the wringer and the washing mechanism. The shaft 10 is connected with the wringer by means of a vertical shaft 11 mounted in bearings 12 and 13, on the frame member 1, and connected with the shaft 10 by beveled gears 14. The upper bearing 12 comprises a socket adapted to receive the supporting device for the wringer, which is not here shown. The tub 15 is mounted between the frame members 1 and 2 for oscillating movement. As here shown I have mounted in the respective frame members stud shafts 16 and 17 which serve to support the respective ends of the tub but which are detachably connected with the tub. Preferably the end walls of the oscillating tub, which is usually formed of sheet copper, are reinforced by central plates or disks 18 having radial arms 19, and these reinforcing plates are utilized in forming the detachable connections between the ends of the tub and the respective stud shafts, but is will be understood that the connecting member does not necessarily have the function of reinforcing the end wall of the tub. Cooperating with the connecting members 18 are other connecting members 20 and 21 mounted, respectively, on the inner ends of the shafts 16 and 17. These second connecting members are also shown in the form of plates or disks and are rotatably mounted on the respective shafts. The two connecting members at each end of the tub are provided with interlocking parts which may be moved into and out of cooperating relation by imparting vertical movement to the tub, thus enabling the tub to be lifted out of the frame or replaced therein. In the present arrangement, the connecting members 18 which are rigidly secured to the ends of the tub, are provided in their lower portions with vertical slots 22 and on their upper portions with projecting studs or pins 23, as shown in Figs. 3 and 4. The rotatable plates 20 and 21 are provided at their lower ends with inwardly extending studs or pins 24 and at their upper ends with vertical slots 25. The slots and studs are arranged on diametrically opposite sides of the axis of the tub and when the latter is in its normal stationary position the vertical movement of the tub will cause the upper studs 23 to be lifted out of the slots 25 of the outer connecting plates and the inner connecting plates 18 will be moved away from the studs 24. Preferably the upper slots 25 are tapered so that the studs 23 will engage the edges of the same with a wedging action to hold the two connecting members firmly against relative movement. If desired, a suitable retaining device may be provided to prevent the accidental separation of the two connecting members and, in the present construction, a curved bar 26 is rigidly secured at its ends to the connecting plate on opposite sides of the slot 25 and extends across the outer side of the stud 23. This connecting bar is so secured to the plate that it may be readily attached to or removed from the same and, as here shown, it is secured thereto by means of screws 27. The tub is held in its normal position, when disconnected from its driving mechanism, by a spring 28 but, if desired, positive stops may be provided to limit the movement of the tub in either direction in case the spring 28 should fail to function. In the present drawings I have shown two inwardly extending stops 29 rigidly secured to the frame member 2 and extending into the paths of lugs 30 carried by the outer connecting plate 20 and so arranged that when the tub is moved a predetermined distance in either direction one of the lugs 30 will engage the corresponding stop 29 and thus check the movement of the tub.

Suitable clutch mechanism is interposed between the tub and its driving mechanism and, in the present embodiment of the invention, the outer connecting member or plate 21, at the left hand side of the machine, constitutes one of the clutch members and to this end it is provided with parts cooperating with a second clutch member 31 which is movable into and out of engagement therewith. As here shown the connecting plate 21 is provided with tapered recesses 32 which may, if desired, extend entirely through the plate, and which are adapted to receive tapered studs 33 carried by the second clutch member 31. As has been stated the clutch member or connecting plate 21 is rotatably mounted on the inner end of the shaft 17 and it is held firmly against axial movement relative to that shaft by means of a head or locking plate 34 rigidly secured to the inner end of the shaft 17. The clutch member 31 is also shown in the form of a disk and is provided with a hub portion 35 which is rotatably and slidably mounted on the shaft 17, the clutch member having a recess 36 to receive the hub of the clutch member 21. The movable clutch member is provided with an arm 37 which is connected by means of a connnecting rod 38 with a crank arm 39 secured to the main driving shaft 10. Sliding movement may be imparted to the clutch member 31, to move it into and out of engagement with the clutch member 21, in any suitable manner, but preferably the hub 35 of the clutch member 31 is provided with a circumferential groove 40 into which extends a pin 41 eccentrically mounted on a head 42 carried by a shaft 43 which is rotatably mounted in a bearing 44 carried by the main frame, the shaft being provided at its outer end with a handle 45 by means of which it may be rotated. In order to hold the shaft and, consequently, the clutch member 31 in their adjusted positions the shaft is slidably mounted in the bearing and is held normally in its innermost position by a spring 46. Mounted on the shaft 43 is a collar 47 having a tapered nose 48 adapted to enter any one of a plurality of recesses 49 on the outer end of the bearing 44. When rotatary movement is imparted to the shaft 43 the tapered end of the nose 48 will be forced out of the recess 49, the shaft yielding longitudinally to permit of this movement, and when the clutch member has been moved to its adjusted position the nose 48 will spring into another recess 49. In the present construction the shaft 17 is rigidly mounted in the frame member 1 and to this end the frame member is provided with a bearing bracket 50 in which the outer end portion of the shaft is mounted. In order to hold the shaft against longitudinal movement relatively to the frame member that portion of the shaft lying within the bearing bracket is provided with inclined surfaces 51 and 52 which are respectively engaged by set screws 53 and 54. The inclined surfaces slope in the same direction and consequently, when the two set screws are tightened down, any thrust on the shaft in either direction will impose a wedging contact on one or the other of the set screws which will firmly hold the shaft against movement, it being understood that the inclined portions are of limited width so that the body of the shaft is firmly held against transverse movement in the bearing.

The shaft being held against movement relatively to the frame and the inner clutch member 21, which is connected with the tub, being held against axial movement relatively to the shaft, it will be apparent that the clutch mechanism as a whole is carried by the frame and that the thrust between the two members of the clutch will be between the two members carried by the frame and not between one part carried by the frame and a separately supported part, and consequently this thrust will impose little or no transverse strain upon the frame and the frame will not tend to spring or become distorted.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a machine of the character described, a frame, an oscillating structure carried by said frame, a shaft mounted on said frame, a clutch member rotatably mounted on the end of said shaft and held against axial movement relatively thereto, said clutch member and one end of said structure having parts adapted to be moved into and out of cooperative relation to establish a supporting connection between said structure and said clutch member, a second clutch member mounted on said shaft, means for moving said second clutch member into and out of cooperative relation with the first mentioned clutch member, and means for imparting driving movement to said second clutch member.

2. In a machine of the character described, a frame, an oscillating structure carried by said frame, a shaft mounted on said frame, a clutch member mounted on said shaft and held against axial movement relatively to the same, said clutch member and one end of said structure having parts adapted to be moved into cooperative relation to establish a supporting connection between said structure and said clutch member, a second clutch member mounted on said shaft, means for moving said second clutch member into and out of operative relation with the first mentioned clutch member, and means for imparting driving movement to said second clutch member.

3. In a machine of the character described, a frame, an oscillating structure carried by said frame, a part mounted in one end of said structure having a slot on one edge thereof and a stud adjacent to the other edge thereof, a shaft mounted on said frame, a clutch member mounted on said shaft, having in one edge a slot to receive the stud on said part and having near the other edge thereof a stud adapted to enter the slot in said part, a second clutch member mounted on said shaft, means for moving said second clutch member into and out of operative relation with the first mentioned clutch member, and means for imparting driving movement to said second clutch member.

4. In a machine of the character described, a frame, a shaft mounted on said frame, clutch mechanism carried by said shaft, one member of said clutch mechanism having a slot in the upper edge thereof and having a stud projecting laterally from the lower portion thereof, an oscillating structure mounted within said frame, a part rigidly secured to one end of said structure, said part having in its lower portion a slot to receive the stud on said clutch member and having on its upper portion a stud to enter the slot in said clutch member.

5. In a machine of the character described, a frame, a shaft mounted on said frame, clutch mechanism carried by said shaft, one member of said clutch mechanism having a slot in the upper edge thereof and having a stud projecting laterally from the lower portion thereof, an oscillating structure mounted within said frame, a part rigidly secured to one end of said structure, said part having in its lower portion a slot to receive the stud on said clutch member and having on its upper portion a stud to enter the slot on said clutch member, and means to retain said last mentioned stud in said slot.

6. In a machine of the character described, a frame, a shaft mounted on said frame, clutch mechanism carried by said shaft, one member of said clutch mechanism having a tapered slot in the upper edge thereof and having a stud projecting laterally from the lower portion thereof, an oscillating structure mounted within said frame, a part rigidly secured to one end of said structure, said part having in its lower portion a slot to receive the stud on said clutch member and having on its upper portion a stud to enter the slot on said clutch member.

7. In a machine of the character described, a main frame comprising end members, stud shafts mounted in the respective end members, connecting members rotatably mounted on the inner ends of the respective shafts, an oscillating structure arranged between said end members, connecting members rigidly secured to the respective ends of said oscillating structure, the connecting members on said structure and the corresponding members on said shafts having cooperating parts to detachably connect the same one to the other, one of the first mentioned connecting members being held against axial movement on its shaft and constituting a clutch member, a second clutch member rotatably and slidably mounted on the shaft of said first mentioned clutch member, means for rigidly securing said shaft to the frame, means for imparting axial movement to said clutch member, and means for imparting driving movement to the second clutch member.

In testimony whereof, I affix my signature hereto.

JAMES L. COFFIELD.